United States Patent
Yamaguchi et al.

(10) Patent No.: US 11,633,723 B2
(45) Date of Patent: Apr. 25, 2023

(54) EXHAUST GAS PURGING COMPOSITION

(71) Applicant: Mitsui Mining & Smelting Co., Ltd., Tokyo (JP)

(72) Inventors: Michitaka Yamaguchi, Saitama (JP); Satoshi Watanabe, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 444 days.

(21) Appl. No.: 16/760,479

(22) PCT Filed: Oct. 3, 2018

(86) PCT No.: PCT/JP2018/037064
§ 371 (c)(1),
(2) Date: Apr. 30, 2020

(87) PCT Pub. No.: WO2019/097878
PCT Pub. Date: May 23, 2019

(65) Prior Publication Data
US 2020/0346191 A1    Nov. 5, 2020

(30) Foreign Application Priority Data
Nov. 17, 2017 (JP) .............................. JP2017-222177

(51) Int. Cl.
*B01J 23/50* (2006.01)
*B01D 53/94* (2006.01)
(Continued)

(52) U.S. Cl.
CPC ............ *B01J 23/50* (2013.01); *B01D 53/944* (2013.01); *B01J 21/04* (2013.01); *B01J 23/34* (2013.01);
(Continued)

(58) Field of Classification Search
None
See application file for complete search history.

(56) References Cited

U.S. PATENT DOCUMENTS

| | | |
|---|---|---|
| 2011/0033352 A1 | 2/2011 | Larcher et al. |
| 2014/0271384 A1 | 9/2014 | Nazarpoor et al. |

(Continued)

FOREIGN PATENT DOCUMENTS

| | | |
|---|---|---|
| EP | 2269731 A1 | 1/2011 |
| JP | 2013-233541 A | 11/2013 |

(Continued)

OTHER PUBLICATIONS

International Search Report (ISR) dated Jan. 8, 2019 filed in PCT/JP2018/037064.

*Primary Examiner* — Colin W. Slifka
(74) *Attorney, Agent, or Firm* — Rankin, Hill & Clark LLP

(57) ABSTRACT

A composition for exhaust gas purification containing Y—Mn—O and $Al_2O_3$ and having a specific surface area (SSA) retention satisfying inequality (1) SSA retention (%) >−61.54×(Y—Mn—O ratio)+75.55 and inequality (2) SSA retention (%) >45 (2), where SSA retention is represented by (SSA after aging)/(initial SSA)×100 (%). The SSA after aging and the initial SSA are as defined in the description. The Y—Mn—O ratio is a mass ratio of Y—Mn—O to the sum of Y—Mn—O and $Al_2O_3$ in the composition for exhaust gas purification, being represented by Y—Mn—O/(Y—Mn—O+$Al_2O_3$).

5 Claims, 1 Drawing Sheet

(51) Int. Cl.
*B01J 21/04* (2006.01)
*B01J 23/34* (2006.01)
*B01J 35/02* (2006.01)
*B01J 37/00* (2006.01)
*F01N 3/28* (2006.01)

(52) U.S. Cl.
CPC ......... *B01J 35/026* (2013.01); *B01J 37/0018* (2013.01); *F01N 3/28* (2013.01); *B01D 2255/104* (2013.01); *B01D 2255/2073* (2013.01); *B01D 2255/9155* (2013.01); *F01N 2370/02* (2013.01)

(56) References Cited

U.S. PATENT DOCUMENTS

| | | |
|---|---|---|
| 2015/0353356 A1 | 12/2015 | Waller et al. |
| 2016/0023188 A1 | 1/2016 | Nazarpoor et al. |
| 2016/0303549 A1 | 10/2016 | Masuda et al. |
| 2017/0028387 A1 | 2/2017 | Ogawa et al. |

FOREIGN PATENT DOCUMENTS

| | | |
|---|---|---|
| JP | 2016-505376 A | 2/2016 |
| WO | 2009/087144 A1 | 7/2009 |
| WO | 2009/130869 A1 | 10/2009 |
| WO | 2012/093599 A1 | 7/2012 |
| WO | 2012/093600 A1 | 7/2012 |
| WO | 2015/079721 A1 | 6/2015 |

EXHAUST GAS PURGING COMPOSITION

TECHNICAL FIELD

This invention relates to a composition for exhaust gas purification containing a composite oxide comprising manganese and yttrium (hereinafter also referred to as Y—Mn—O).

BACKGROUND ART

Exhaust gas from internal-combustion engines, such as gasoline engines and diesel engines, of automobiles and motor cycles (also called saddled vehicles) contains harmful components, such as HC and CO. Oxidation catalysts have hitherto been used to purify exhaust gas and detoxify the harmful components. Noble metals, such as Pt, Pd, and Rh, combined with alumina, ceria, zirconia, or their composite oxides in predetermined ratios have been used as such oxidation catalysts.

Recently, catalysts for exhaust gas purification having a manganese-yttrium composite oxide as a support have been proposed (see, e.g., patent literatures 1 to 3).

CITATION LIST

Patent Literature

Patent literature 1: WO 2012/093599
Patent literature 2: JP 2013-233541A
Patent literature 3: US 2017/0028387A

SUMMARY OF INVENTION

The catalysts described in patent literatures 1 to 3 are all designed for diesel engines. It is said that the exhaust temperature of diesel engines are 150° to 400° C., while that of gasoline engines are 350° to 700° C., and thus, the exhaust temperature from gasoline engines is generally higher than that from diesel engines. In this regard, the catalysts of patent literatures 1 to 3 have room for improvement on durability in high temperatures of gasoline engine exhaust, particularly thermal durability at higher temperatures of about 900° to 1150° C.

An object of the invention is to provide a composition for exhaust gas purification having excellent durability to high temperature exhaust gas.

The invention provides a composition for exhaust gas purification containing an yttrium-manganese composite oxide and $Al_2O_3$ and having a specific surface area (hereinafter abbreviated as SSA) retention satisfying inequalities (1) and (2):

$$\text{SSA retention (\%)} > -61.54 \times (\text{Y—Mn—O ratio}) + 75.55 \quad (1)$$

$$\text{SSA retention (\%)} > 45 \quad (2)$$

The SSA retention is represented by (SSA after aging)/(initial SSA)×100 (%). The term "initial SSA" is defined to be the SSA ($m^2/g$) of a composition for exhaust gas purification having been subjected to a heat treatment at 500° C. for 1 hour followed by no further heat treatment. The term "SSA after aging" is defined to be the SSA ($m^2/g$) of a composition for exhaust gas purification having been subjected to a heat treatment at 500° C. for 1 hour followed by another heat treatment at 980° C. for 25 hours. The term "Y—Mn—O" refers to the yttrium-manganese composite oxide, and the term "Y—Mn—O ratio" refers to a mass ratio of the Y—Mn—O to the sum of the Y—Mn—O and $Al_2O_3$ in the composition for exhaust gas purification, being represented by Y—Mn—O/(Y—Mn—O+$Al_2O_3$).

The invention also provides a catalyst for exhaust gas purification containing the composition for exhaust gas purification and a catalyst active component. The catalyst active component contains at least one element selected from Ag, Mn, Ni, Pt, Pd, Rh, Au, Cu, Fe, and Co.

The invention also provides a composition for exhaust gas purification containing an yttrium-manganese composite oxide and $Al_2O_3$. The composite oxide has a particle diameter D50 of 70% or smaller than that of $Al_2O_3$ at 50% of the cumulative particle size distribution on a volume basis as measured by laser diffraction particle size analysis.

DESCRIPTION OF EMBODIMENTS

Figure 1:
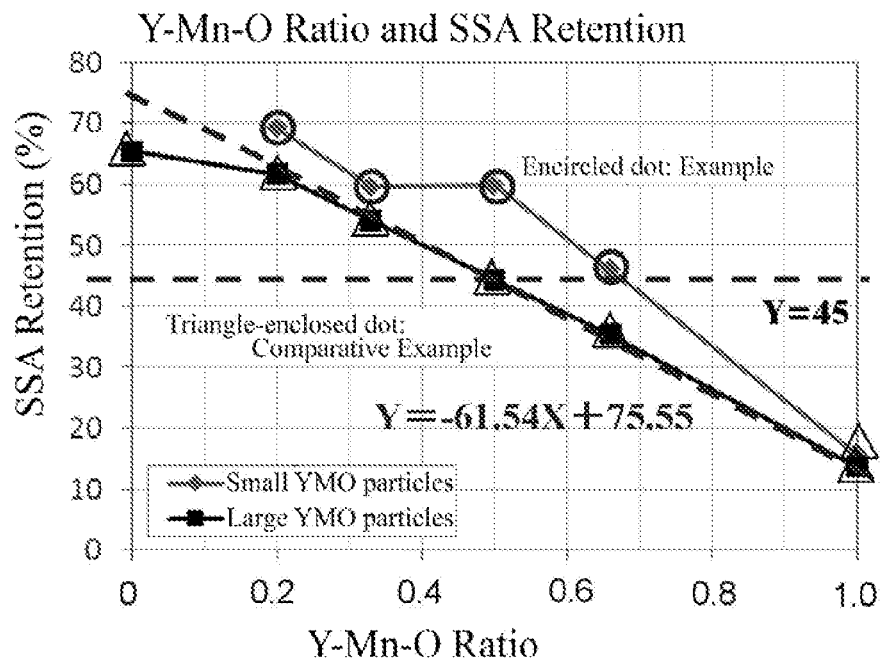
FIG. 1 is a graph of SSA retention plotted against Y—Mn—O ratio in Examples and Comparative Examples.

The invention will be described on the basis of its preferred embodiments.

The composition for exhaust gas purification according to the present embodiment contains an yttrium-manganese composite oxide (Y—Mn—O) and $Al_2O_3$. Both Y—Mn—O and $Al_2O_3$ to be used in the composition of the embodiment are in powder form. The composition of the embodiment may be in the form, e.g., of powder or slurry.

Y—Mn—O may be any composite oxide containing manganese and yttrium. Examples of Y—Mn—O include one member or a mixture of two or more members selected from the group consisting of $YMn_2O_5$, $Y_{1-x}A_xMn_{2-z}B_zO_5$ (where A is La, Sr, Ce, Ba, Ca, Sc, Ho, Er, Tm, Yb, Lu, or Bi; B is Co, Fe, Ni, Cr, Mg, Ti, Nb, Ta, Cu, or Ru; $0.5 \geq x \geq 0$; and $1 \geq z \geq 0$), $YMnO_3$, $Y_{1-x}A_xMn_{1-z}B_zO_3$ (where A is La, Sr, Ce, Ba, Ca, Sc, Ho, Er, Tm, Yb, Lu, or Bi; B is Co, Fe, Ni, Cr, Mg, Ti, Nb, Ta, Cu, or Ru; $0.5 \geq x \geq 0$; and $1 \geq z \geq 0$), and $Y_2Mn_2O_5$. Preferred of them is one member or a mixture of two or more members selected from the group consisting of $YMn_2O_5$ and $Y_{1-x}A_xMn_{2-z}B_zO_5$ (where A is La, Sr, Ce, Ba, Ca, Sc, Ho, Er, Tm, Yb, Lu, or Bi; B is Co, Fe, Ni, Cr, Mg, Ti, Nb, Ta, Cu, or Ru; $0.5 \geq x \geq 0$; and $1 \geq z \geq 0$) with a view to improving oxidation activity. Inter alia, $YMn_2O_5$ is preferred.

$YMn_2O_5$ is not limited by the method of preparation. For example, $YMn_2O_5$ can be prepared according to the method described in WO 2012/093599. Specifically, $Y_2O_3$ and $MnO_2$ as starting materials are weighed out in an Y to Mn atomic ratio of ½, mixed and ground using a ball mill or the like preferably for at least 3 hours, and then calcined in the atmosphere preferably at 800° to 1100° C., more preferably 850° to 950° C., preferably for 1 to 24 hours, more preferably 4 to 10 hours to produce $YMn_2O_5$ as a composite oxide. This method will hereinafter be referred to as method 1.

The composite oxide $YM_2O_5$ can also be prepared by a method in which a precipitant is added to a solution containing yttrium and manganese to form a precursor having an Y to Mn atomic ratio of ½, and drying and calcining the precursor. This method will hereinafter be referred to as method 2. The yttrium- and manganese-containing solution is prepared by dissolving an yttrium compound and a manganese compound in a solvent. Part of the yttrium compound may be displaced with a compound of an element selected from La, Sr, Ce, Ba, Ca, Sc, Ho, Er, Tm, Yb, Lu, and Bi. Part of the manganese compound may be displaced with a compound of an element selected from Co, Fe, Ni, Cr, Mg, Ti, Nb, Ta, Cu, and Ru.

Examples of the yttrium compound include yttrium nitrate, oxalate, acetate, ammine complex salt, and chloride. Examples of the manganese compound include manganese nitrate, oxalate, acetate, ammine complex salt, and chloride. Examples of the precipitant include basic substances, such as aqueous ammonia and sodium hydroxide. It is preferable to use an oxidizing agent, such as hydrogen peroxide, in the precipitation system.

$YMn_2O_5$ may also be prepared by the following method: potassium permanganate and manganese(II) chloride are mixed into an yttrium nitrate aqueous solution so as to result in a Y to Mn molar ratio of ½ and an $Mn^{2+}$ to $Mn^{7+}$ molar ratio of 7:3, a sodium hydroxide aqueous solution is added thereto, and the resulting mixture is subjected to hydrothermal treatment. This method will hereinafter be referred to as method 3.

The presence of Y—Mn—O in the composition for exhaust gas purification of the embodiment is confirmed through X-ray diffractometry of the composition. In the case when the composition contains $YMn_2O_5$, for example, peaks assigned to the (121), (211), and (130) planes of $YMn_2O_5$ are observed in 2θ angle ranges of from 28° to 30°, from 30° to 32°, and from 33° to 35°, respectively, in the pattern from X-ray diffractometry on the composition for exhaust gas purification using CuKα ray as a radiation source.

The inventors have intensively investigated the high-temperature durability of compositions containing Y—Mn—O. They have found as a result that a composition having a specific surface area (SSA) retention after a high temperature aging test that satisfies a specific relation with the Y—Mn—O content exhibits high-temperature durability.

Specifically, the SSA retention of the composition of the embodiment preferably satisfies inequalities (1) and (2):

SSA retention (%)>−61.54×(Y—Mn—O ratio)+ 75.55        (1)

SSA retention (%)>45        (2)

The SSA retention in inequalities (1) and (2) is represented by (SSA after aging)/(initial SSA)×100 (%).

The "initial SSA" is defined to be the SSA ($m^2$/g) of the composition for exhaust gas purification having been subjected to a heat treatment at 500° C. for 1 hour followed by no further heat treatment at or above 500° C. Here, the heat treatment is carried out by elevating the temperature from room temperature to 500° C. at a rate of 5° C./min, followed by spontaneous cooling from 500° C. to room temperature. After cooling down, a measurement of specific surface area is made.

On the other hand, the "SSA after aging" is defined to be the SSA ($m^2$/g) of the composition for exhaust gas purification having been subjected to the heat treatment at 500° C. for 1 hour as described above, followed by another heat treatment at 980° C. for 25 hours. The rate of temperature rise from 500° to 980° C. is 5° C./min, and the following cooling from 980° C. to room temperature is spontaneous cooling. After the cooling, a specific surface area measurement is made.

The composition for exhaust gas purification of the embodiment may be either the one not having been heat-treated at 500° C. or higher or the one having been heat-treated at 500° C. or higher. In other words, as long as the SSA retention of a composition, which is calculated from the SSA ($m^2$/g) measured after heat treatment at 500° C. for 1 hour followed by no further heat treatment and the SSA ($m^2$/g) measured after heat treatment at 500° C. for 1 hour followed by another heat treatment at 980° C. for 25 hours, satisfies inequalities (1) and (2), the composition is encompassed by the composition for exhaust gas purification of the invention regardless of whether the composition has been heat treated at 500° C. or higher before the determination of the SSA retention.

The heating at 500° C. and the heating at 980° C. are each carried out in the atmosphere. The measurement of SSA ($m^2$/g) is carried out by the BET single-point method. More specifically, the SSA measurement may be made by the method described in Examples given later.

The term "Y—Mn—O ratio" refers to the mass ratio of the Y—Mn—O to the sum of the Y—Mn—O and $Al_2O_3$ in the composition for exhaust gas purification (Y—Mn—O/ (Y—Mn—O+$Al_2O_3$)).

For example, the Y—Mn—O ratio is obtained by ICP-AES on a sample solution of the composition prepared by, e.g., alkali fusion.

The inventors believe that the reason for the excellent high-temperature thermal durability of the composition satisfying inequalities (1) and (2) is as follows. On exposure to high temperatures, a conventional Y—Mn—O-containing composition for exhaust purification reduces in specific surface area on account of sintering between Y—Mn—O particles and, as a consequence, suffers from reduction in exhaust purification performance. In this relation, the inventors have noted that $Al_2O_3$ mixed with Y—Mn—O is capable of acting as a partition between Y—Mn—O particles. Even when the composition for exhaust purification is exposed to high temperatures, Y—Mn—O is prevented from sintering by $Al_2O_3$ acting as a partition between Y—Mn—O particles, whereby the reduction in specific surface area and the resultant deterioration in exhaust purification performance are prevented.

As illustrated in FIG. 1 of Examples given later, the SSA retention tends to decrease with an increase in Y—Mn—O ratio in the $Al_2O_3$/Y—Mn-0 mixture. In the invention, the SSA retention shall be higher than a certain minimum value, i.e., higher than 45%, so that sintering between the Y—Mn—O particles that may occur due to, for example, too high a Y—Mn—O ratio is avoided.

When the SSA is larger than a value predetermined on the basis of the Y—Mn—O ratio, sintering of Y—Mn—O is prevented effectively even under the condition that the SSA retention is higher than 45%.

For the above reasons, the composition which contains $Al_2O_3$ and provides a SSA retention higher than 45% after high temperature aging test and also higher than the value of the right side of inequality (1) on the basis of the Y—Mn—O ratio exhibits excellent exhaust gas purification performance. In view of fully exhibiting such an effect of $Al_2O_3$, it is desirable that the particle size of Y—Mn—O, e.g., a particle diameter D50 at 50% of the cumulative particle size distribution on a volume basis measured by laser diffraction particle size analysis, be 70% or smaller of that of $Al_2O_3$. The inventors consider that using larger $Al_2O_3$ particles than Y—Mn—O particles allows reducing the probability of mutual contact between Y—Mn—O particles so as to effectively prevent Y—Mn—O from sintering in high temperatures, and that the reduction in specific surface area will thus be prevented to improve the heat resistance. Furthermore, when the above-described particle size relation between Y—Mn—O and $Al_2O_3$ is satisfied, it will be easier to obtain the composition for exhaust gas purification satisfying inequalities (1) and (2).

From the above described viewpoint, the particle diameter D50 of Y—Mn—O at 50% of the cumulative particle size distribution on a volume basis as measured by laser diffraction particle size analysis is more preferably 50% or smaller, even more preferably 30% or smaller, still more preferably 10% or smaller, of that of $Al_2O_3$. The D50 of Y—Mn—O is preferably 0.1% or larger, more preferably 1% or larger, of that of $Al_2O_3$.

With a view to further enhancing the heat resistance improving effect, the D50 of Y—Mn—O is preferably 6 μm or smaller, more preferably 3 μm or smaller, even more preferably 2 μm or smaller, still more preferably 1 μm or smaller. The D50 of Y—Mn—O is preferably 0.01 μm or greater, more preferably 0.1 μm or greater, in terms of adhesion to a substrate.

Y—Mn—O with the above specified particle size can be prepared by pulverization of Y—Mn—O followed by, if necessary, classification. In the case of $YMn_2O_5$, for example, $YMn_2O_5$ as obtained by method 1 or 2 is pulverized and, if necessary, classified to give $YMn_2O_5$ with a desired particle size. The pulverization may be carried in either a wet process or a dry process. Wet pulverization can be performed using a known solvent, such as water or ethanol. The classification may be carried out using filter paper, a membrane filter, or the like. When method 3 is followed, $YMn_2O_5$ with the particle size in the above range can be obtained by adjusting the pH of the liquid to be subjected to hydrothermal treatment.

The D50 of Y—Mn—O is the 50% diameter of a cumulative particle size distribution on a volume basis measured by laser diffraction particle size analysis. Laser diffraction particle size distribution analysis may be carried out as follows. A sample powder is put in an aqueous solvent using an automated sample circulator for laser diffraction particle size distribution analysis (Microtrack SDC from MicrotracBEL Corp.) and dispersed with ultrasonics (40 W, 360 sec) as they flow in the circulator at a flow velocity set at 40%. The particle size distribution is analyzed using Microtrac MT3300EXII from MicrotracBEL Corp. under the following conditions: a particle refractive index, 1.5; particle shape, true sphere; solvent refractive index, 1.3; set zero time, 30 seconds; run time, 30 seconds; and number of runs, 2. An average of the two runs is obtained. It is preferable to use pure water as the aqueous solvent.

With the view to further enhancing the heat resistance improving effect, the D50 of $Al_2O_3$ is preferably 4 μm or greater, more preferably 5 μm or greater, even more preferably 6 μm or greater, still more preferably 7 μm or greater. In view of availability of $Al_2O_3$ and adhesion to a substrate, the D50 of $Al_2O_3$ is preferably 15 μm or smaller, more preferably 13 μm or smaller.

The D50 of $Al_2O_3$ is the 50% diameter of a cumulative particle size distribution on a volume basis measured by laser diffraction particle size analysis. Laser diffraction particle size distribution analysis may be carried out as follows. A sample powder is put in an aqueous solvent using an automated sample circulator for laser diffraction particle size distribution analysis (Microtrack SDC from MicrotracBEL Corp.) and dispersed with ultrasonics (40 W, 360 sec) as they flow in the circulator at a flow velocity set at 40%. The particle size distribution is analyzed using Microtrac MT3300EXII from MicrotracBEL Corp. under the following conditions: a particle refractive index, 1.5; particle shape, true sphere; solvent refractive index, 1.3; set zero time, 30 seconds; run time, 30 seconds; and number of runs, 2. An average of the two runs is obtained. It is preferable to use pure water as the aqueous solvent.

Examples of $Al_2O_3$ include γ-alumina, β-alumina, δ-alumina, and θ-alumina. Although any of them may be usable, θ-alumina is particularly preferred because it is capable of providing high improving effect on high temperature durability while retaining the specific surface area of the composition when combined with Y—Mn—O.

The Y—Mn—O ratio of the composition for exhaust gas purification is preferably 0.1 to 0.9, more preferably 0.2 to 0.8, even more preferably 0.3 to 0.7, still more preferably 0.4 to 0.7, yet more preferably 0.4 to 0.6, in terms of ease of preparation of the composition satisfying inequalities (1) and (2) and enhancement of exhaust gas purification performance.

The initial SSA of the composition for exhaust gas purification is preferably 45 to 85 $m^2/g$, more preferably 50 to 75 $m^2/g$, in terms of enhancement of exhaust gas purification performance and ease of preparation of the composition. The SSA after aging of the composition is preferably 25 $m^2/g$ or more, more preferably 30 $m^2/g$ or more, with a view to efficiently providing the exhaust gas purification performance.

With a view to preventing sintering of Y—Mn—O thereby to ensure the excellent heat resistance of the composition for exhaust gas purification, the SSA retention (%) of the composition is preferably higher than the value of (−61.54×(Y—Mn—O ratio)+75.55 (%)) by at least 1%, more preferably 2% or more, even more preferably 3% or more. In particular, when the difference between the SSA retention (%) and the value of (−61.54×(Y—Mn—O ratio)+75.55 (%)) is 3% or larger with an initial SSA of 50 $m^2/g$ or larger, the composition is especially excellent in not only initial activity but heat resistance.

The composition for exhaust gas purification may contain a compound other than Y—Mn—O or $Al_2O_3$. When the composition contains at least one catalyst active component selected from Ag, Mn, Ni, Pt, Pd, Rh, Au, Cu, Fe, and Co, the composition exhibits improved oxygen storage properties and enhanced exhaust purification performance. The composition for exhaust gas purification that contains the catalyst active component will hereinafter be called a catalyst for exhaust gas purification or an exhaust gas purification catalyst. The catalyst active component may exist in the form of metal or metal oxide in the catalyst for exhaust gas purification. In the composition and catalyst for exhaust gas purification, for example, Mn loaded on the support, such as Y—Mn—O, is usually in the form of $MnO_x$, while Ag loaded on the support, such as Y—Mn—O, is usually in the form of metallic Ag.

It is preferred that the catalyst for exhaust gas purification contain at least one of Ag, Mn, Pt, Pd, and Rh as a catalyst active component in terms of further improved exhaust gas purification performance. In particular, using at least one of Ag and Mn but not an expensive noble metal, such as Pt, Pd, or Rh, will be a useful technique that meets the recent demand for noble-metal-saving catalysts for exhaust gas purification. The catalyst active component may be loaded on the surface of Y—Mn—O and/or $Al_2O_3$ or be in a mixed state with Y—Mn—O and $Al_2O_3$.

The total content of the catalyst active component in the exhaust gas purification catalyst is preferably 0.1 to 30 mass % based on the total mass of Y—Mn—O and $Al_2O_3$ in view of enhancement of heat resistance of the exhaust gas purification performance and production cost of the composition for exhaust gas purification. From the same viewpoint, the total content of the catalyst active component is more preferably 1 to 30 mass %, even more preferably 5 to 20 mass %, based on the total mass of the Y—Mn—O and $Al_2O_3$. The catalyst active component in the exhaust gas purification catalyst may comprise two or more components. In such a case, a combination of a noble metal and a metal other than a noble metal (a non-noble metal) is preferably used in terms of cost and performance. The noble metal to non-noble metal mass ratio is preferably 1:0.01 to 1:10, more preferably 1:0.1 to 1:1, in terms of metal. When a combination of non-noble metals, e.g., a combination of Ag and Mn is used, the mass ratio therebetween is preferably 10:1 to 1:10 in terms of metal.

The content of the catalyst active component is obtained by determining by ICP-AES the amount of Ag, Mn, Ni, Pt, Pd, Rh, Au, Cu, Fe, Co, etc.in a catalyst sample solution prepared by, e.g., alkali fusion. In particular, the content of Mn as a catalyst active component is obtained by determining the amounts of Y and Mn in a catalyst solution prepared by, e.g., alkali fusion by ICP-AES and subtracting, from the amount of Mn in the solution, the amount of Mn of the support calculated on the basis of the Y to Mn ratio of Y—Mn—O as determined by X-ray diffractometry.

The composition and catalyst for exhaust gas purification may contain a binder for applying it to a substrate. Examples of useful binders include inorganic powders, such as alumina sol and zirconia sol. In using a binder, the binder content in the composition and catalyst for exhaust gas purification is preferably 5 to 20 mass % in order not to damage the exhaust gas purification performance and adhesion strength.

The composition and catalyst for exhaust gas purification may further contain a component other than Y—Mn—O or $Al_2O_3$, in addition to the catalyst active component and binder. Examples of the component other than Y—Mn—O or $Al_2O_3$ include $TiO_2$, $SiO_2$, zeolite, MgO, $MgAl_2O_4$, $CeO_2$, $ZrO_2$, and $CeO_2$—$ZrO_2$ composite oxide. The content of the component other than Y—Mn—O or $Al_2O_3$ (except the catalyst active component and binder) in the composition and catalyst for exhaust gas purification is preferably up to 50 mass %, more preferably 40 mass % or less, even more preferably 30 mass % or less.

The Y—Mn—O—/$Al_2O_3$-containing composition for exhaust gas purification can be prepared in any manner. Y—Mn—O powder and $Al_2O_3$ powder may be mixed in powder form or slurry form.

The catalyst for exhaust gas purification containing Y—Mn—O, $Al_2O_3$, and a catalyst active component may be prepared by, for example, mixing the catalyst active component into a powder or slurry containing Y—Mn—O and $Al_2O_3$.

The catalyst may also be prepared by immersing Y—Mn—O and $Al_2O_3$ in a solution containing a catalyst active component in the form of nitrate, oxalate, acetate, ammine complex salt, chloride, or the like to form a slurry, which is dried and calcined to load Y—Mn—O and $Al_2O_3$ with the catalyst active component.

The solvent used in the above described slurries and solutions may be water.

The above described slurry may be applied to a catalyst substrate, dried, and calcined to form a catalyst layer having the catalyst and supported on the substrate. The calcining is preferably carried out in the atmosphere at 450° to 600° C. for 1 to 3 hours.

The catalyst substrate may be made, e.g., of ceramics or metallic materials. While the shape of the catalyst substrate is not particularly limited, the substrate usually has the form of, for example, a honeycomb, a plate, pellets, a DPF, or a GPF. A honeycomb, DPF, or GPF is preferably used. These catalyst substrates may be made of ceramics, such as alumina ($Al_2O_3$), mullite ($3Al_2O_3\cdot2SiO_2$), cordierite ($2MgO\cdot2Al_2O_3\cdot5SiO_2$), aluminum titanate ($Al_2TiO_5$), and silicon carbide (SiC); or metallic materials, such as stainless steel.

As described above, the exhaust gas purification composition and catalyst in the form of a catalyst layer according to the present embodiment exhibit stable catalytic ability even when exposed to high temperatures of about 900° to 1150° C. Accordingly, the composition for exhaust gas purification exhibits high and stable exhaust purification performance in fossil fuel-powered internal-combustion engines, such as gasoline engines and diesel engines. The exhaust gas purification composition of the embodiment is especially suited to purify exhaust gas from gasoline engines of automobiles, motor cycles, and so forth because of its high heat resistance.

EXAMPLES

The invention will now be illustrated in greater detail with reference to Examples, but it should be understood that the invention is not deemed to be limited thereto. Unless otherwise specified, all the percentages are by mass.

Example 1

(1) Synthesis of $YMn_2O_5$

An yttrium nitrate aqueous solution (from Wako Pure Chemical Inds., Ltd.) as an yttrium compound, manganese nitrate hexahydrate (from Wako Pure Chemical) as a manganese compound, and 25% aqueous ammonia (from Wako Pure Chemical) as a base were provided. The aqueous ammonia and a 30% hydrogen peroxide solution (from Wako Pure Chemical) were mixed with 10 times their total volume of water. The resulting aqueous solution was slowly added to a mixed aqueous solution of yttrium nitrate and manganese nitrate while stirring to cause co-precipitation. Here, the molar ratio of Y:Mn: ammonia:hydrogen peroxide was 1:2:10:3. After completion of the addition, the stirring was continued for about one hour for aging. The reaction system was left to stand overnight, and the product was collected by filtration, washed with pure water, dried at 120° C. overnight, crashed, and calcined at 800° C. for 5 hours. The drying and calcining were conducted in the atmosphere.

(2) Pulverization and classification of $YMn_2O_5$

The $YMn_2O_5$ obtained in (1) above was dispersed in water and pulverized in a ball mill. The resulting slurry was filtered through filter paper with a pore size of about 1 μm. The filtrate slurry was heated at 100° C. until the water content decreased to result in a concentration suitable for application to a substrate. The $YMn_2O_5$ content of the slurry was 20%. The D50 of $YMn_2O_5$ measured by the method described above (aqueous solvent: water) using a laser diffraction particle size analyzer (MT3300EXII, from MicrotracBEL) was 0.158 μm.

(3) Preparation of Catalyst Slurry

Silver nitrate (from Wako Pure Chemical) and manganese nitrate hexahydrate (from Wako Pure Chemical) were added to the $YMn_2O_5$-containing slurry prepared in (2) above and thoroughly dissolved therein by stirring. $Al_2O_3$ (θ-alumina) having the D50 shown in Table 1 below (measured by the method described above using water as an aqueous solvent) was added thereto and dispersed well by stirring. An alumina binder was then added and dispersed well by stirring to prepare a catalyst slurry. The mixing ratio of silver nitrate, manganese nitrate hexahydrate, YMn$_2$O$_5$, Al$_2$O$_3$, and the binder was adjusted so that the finally formed catalyst layer might have the composition shown in Table 1, in which "Ag" indicates silver originated in silver nitrate, and "Mn" indicates manganese originated in manganese nitrate hexahydrate.

(4) Catalyst Coating on Honeycomb

A honeycomb substrate (Φ25.4 mm×L 30 mm) made of cordierite was immersed in the catalyst slurry prepared in (3) above. An excess of the slurry was blown off with air to form a catalyst slurry layer of 200 g per liter of the honeycomb (inclusive of the cell spaces). The catalyst slurry layer was dried at 120° C. for 3 hours and then calcined in the atmosphere at 500° C. for 1 hour to provide an exhaust gas purification catalyst (in the form of layer on the honeycomb substrate) of Example 1.

Examples 2 to 4 and Comparative Examples 1 to 7

An exhaust gas purification catalyst was made in the same manner as in Example 1, except for changing the amounts of YMn$_2$O$_5$ and Al$_2$O$_3$ so as to give the catalyst composition shown in Table 1 and making another alteration to the step of (2) pulverization and classification of YMn$_2$O$_5$ as follows. In Example 3 and Comparative Example 7, filter paper of the same pore size as in Example 1 was used to obtain YMn$_2$O$_5$ with a D50 of 0.152 μm. In Comparative Examples 2 to 6, filter paper of the same pore size as in Example 1 was used in the filtration, and the YMn$_2$O$_5$ remaining on the filter paper was collected to give YMn$_2$O$_5$ having a D50 of 6.964 μm, which was used in the subsequent steps.

TABLE 1-continued

| | Catalyst Composition (%) | | | | | D50 of Y-Mn-O (μm) | D50 of Al$_2$O$_3$ (μm) |
|---|---|---|---|---|---|---|---|
| | Ag | Mn | YMn$_2$O$_5$ | Al$_2$O$_3$ | Binder | | |
| Example 5 Compara. Example 6 | 9.3 | 4 | 79.7 | 0.0 | 7 | 6.964 | — |
| Compara. Example 7 | 9.3 | 4 | 79.7 | 0.0 | 7 | 0.152 | — |

The activity of the catalysts obtained in Examples 1 to 4 and Comparative Examples 1 to 7 was evaluated by the method below.

Methods of evaluation:
Evaluation 1—Determination of SSA Retention
(a) Sample Preparation for SSA Measurement A 3 g portion, on solid basis, of the catalyst slurry prepared in step (3) in Examples and Comparative Examples was dried at 120° C. for 3 hours and calcined in the atmosphere at 500° C. for 1 hour. The rate of temperature rise and the cooling condition were as previously described.

(b) Heat Treatment and BET SSA Measurement

The powder as calcined in (a) above was heat treated in the atmosphere at 980° C. for 25 hours. The rate of temperature rise and the cooling condition were as previously described. The BET SSA of the sample was measured before and after the heat treatment by the method described above using QUADRASORB SI from Quantachrome. The SSA retentions obtained in Examples and Comparative Examples are shown in Table 2, in which are also shown the Y—Mn—O ratio, initial SSA, and the value [−61.54×(Y—Mn—O ratio)+75.55] calculated from the Y—Mn—O ratio.

TABLE 2

| | Y-Mn-O Ratio | Initial SSA (m$^2$/g) | SSA Retention (%) | −61.54 × (Y-Mn-O ratio) + 75.55 |
|---|---|---|---|---|
| Example 1 | 0.20 | 80.6 | 69.2 | 63.24 |
| Example 2 | 0.33 | 73.5 | 59.5 | 55.24 |
| Example 3 | 0.50 | 66.0 | 59.8 | 44.78 |
| Example 4 | 0.66 | 54.6 | 46.0 | 34.93 |
| Compara. Example 1 | 0.00 | 89.1 | 65.3 | 75.55 |
| Compara. Example 2 | 0.20 | 85.5 | 61.6 | 63.24 |
| Compara. Example 3 | 0.33 | 77.3 | 54.0 | 55.24 |
| Compara. Example 4 | 0.50 | 75.2 | 44.4 | 44.78 |
| Compara. Example 5 | 0.66 | 72.8 | 35.4 | 34.93 |
| Compara. Example 6 | 1.00 | 60.0 | 13.7 | 14.01 |
| Compara. Example 7 | 1.00 | 43.8 | 15.8 | 14.01 |

TABLE 1

| | Catalyst Composition (%) | | | | | D50 of Y-Mn-O (μm) | D50 of Al$_2$O$_3$ (μm) |
|---|---|---|---|---|---|---|---|
| | Ag | Mn | YMn$_2$O$_5$ | Al$_2$O$_3$ | Binder | | |
| Example 1 | 9.3 | 4 | 15.95 | 63.75 | 7 | 0.158 | 9.242 |
| Example 2 | 9.3 | 4 | 26.3 | 53.4 | 7 | 0.158 | 9.242 |
| Example 3 | 9.3 | 4 | 39.85 | 39.85 | 7 | 0.152 | 9.242 |
| Example 4 | 9.3 | 4 | 52.6 | 27.1 | 7 | 0.158 | 9.242 |
| Compara. Example 1 | 9.3 | 4 | 0.0 | 79.7 | 7 | — | 9.242 |
| Compara. Example 2 | 9.3 | 4 | 15.95 | 63.75 | 7 | 6.964 | 9.242 |
| Compara. Example 3 | 9.3 | 4 | 26.3 | 53.4 | 7 | 6.964 | 9.242 |
| Compara. Example 4 | 9.3 | 4 | 39.85 | 39.85 | 7 | 6.964 | 9.242 |
| Compara. Example 5 | 9.3 | 4 | 52.6 | 27.1 | 7 | 6.964 | 9.242 |

Evaluation 2—Determination of Catalytic Activity

The honeycomb catalysts made in step (4) of Examples and Comparative Examples were each heat treated in the atmosphere at 980° C. for 25 hours and then evaluated for performance as follows.

Figure 2:
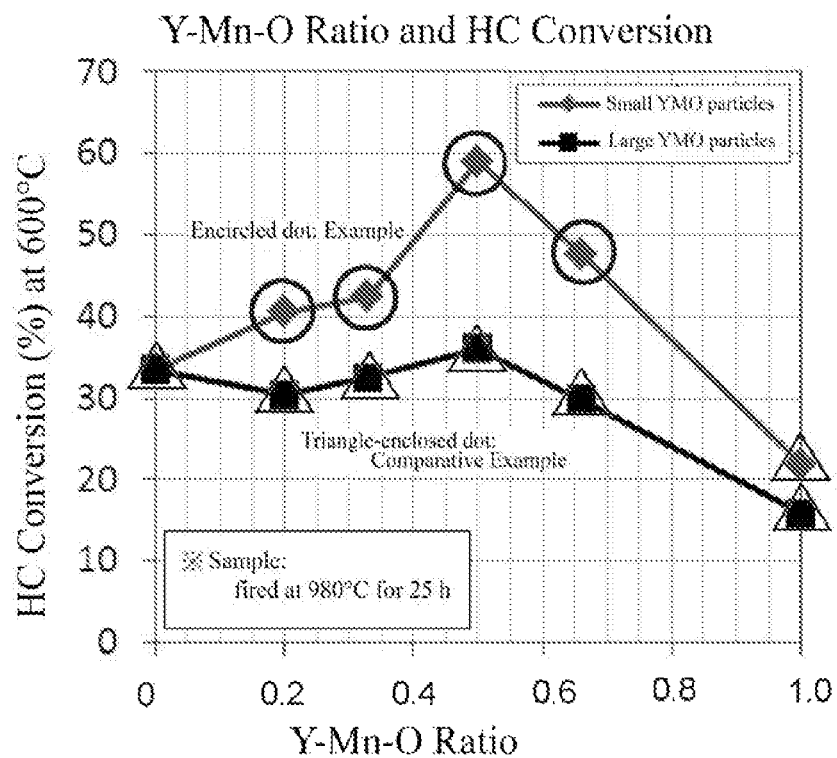
FIG. 2 is a graph of HC conversion plotted against Y—Mn—O ratio in Examples and Comparative Examples.

A simulated exhaust gas consisting of C$_5$H$_{12}$, CO, CO$_2$, O$_2$, NO, H$_2$O, and N$_2$ balance and having the composition shown in Table 3, which reflects an air-fuel ratio A/F of 14.6, was heated from 100° C. up to 610° C. at a rate of 20° C./min and passed through the honeycomb catalyst at a space velocity of 10,000 h$^{-1}$. The outlet gas was analyzed using a CO/HC/NO analyzer (Motor Exhaust Gas Analyzer MEXA9100, from Horiba, Ltd.). The calculated HC (hydrocarbon) conversion is shown in Table 4, in which are also shown the Y—Mn—O ratio and whether the inequalities (1) and/or (2) is (are) satisfied. In FIG. 1 is shown a graph of SSA retention plotted against Y—Mn—O ratio in Examples 1 to 4 and Comparative Examples 1 to 7. In FIG. 2 is shown a graph of HC conversion in simulated exhaust gas at 600° C. plotted against Y—Mn—O ratio in Examples 1 to 4 and Comparative Examples 1 to 7.

TABLE 3

| A/F | 14.6 |
| --- | --- |
| CO | 0.255% |
| $C_5H_{12}$ | 600 ppmC |
| NO | 250 ppm |
| $O_2$ | 0.21% |
| $CO_2$ | 10% |
| $H_2O$ | 10% |
| $N_2$ | balance |

The composition in Table 3 is based on volume ratio.

TABLE 4

| | | Satisfied or not | | | HC Conversion (%) |
| --- | --- | --- | --- | --- | --- |
| | Y-Mn-O Ratio | Inequality (1) | Inequality (2) | Inequalities (1) and (2) | |
| Example 1 | 0.20 | yes | yes | yes | 40.6 |
| 2 | 0.33 | yes | yes | yes | 42.5 |
| 3 | 0.50 | yes | yes | yes | 59.0 |
| 4 | 0.66 | yes | yes | yes | 47.7 |
| Compara. Example 1 | 0.00 | no | yes | no | 33.5 |
| 2 | 0.20 | no | yes | no | 30.4 |
| 3 | 0.33 | no | yes | no | 32.5 |
| 4 | 0.50 | no | no | no | 36.1 |
| 5 | 0.66 | yes | no | no | 29.9 |
| 6 | 1.00 | no | no | no | 15.8 |
| 7 | 1.00 | yes | no | no | 21.9 |

It is seen from FIG. 1 that the SSA retention of each composition for exhaust gas purification of Comparative Examples 2 to 6 is almost equal to the value calculated from the function of inequality (1) while that of each composition of Examples 1 to 4 exceeds the value calculated from the function of inequality (1) and also exceeds 45%. It is seen from FIG. 2 that the compositions for exhaust gas purification of Examples achieve higher HC conversions than those of Comparative Examples.

INDUSTRIAL APPLICABILITY

The invention provides a composition and a catalyst both for exhaust gas purification having excellent durability against high-temperature exhaust gas.

The invention claimed is:

1. A composition for exhaust gas purification comprising an yttrium-manganese composite oxide and $Al_2O_3$ and having a specific surface area (SSA) retention satisfying inequalities (1) and (2):

$$\text{SSA retention (\%)} > -61.54 \times (\text{Y—Mn—O ratio}) + 75.55 \quad (1)$$

$$\text{SSA retention (\%)} > 45 \quad (2)$$

wherein SSA retention is represented by (SSA after aging)/(initial SSA)×100 (%); initial SSA is the SSA ($m^2/g$) of a composition for exhaust gas purification having been subjected to a heat treatment at 500° C. for 1 hour followed by no further heat treatment; SSA after aging is the SSA ($m^2/g$) of the composition for exhaust gas purification having been subjected to a heat treatment at 500° C. for 1 hour followed by another heat treatment at 980° C. for 25 hours; Y—Mn—O represents the yttrium-manganese composite oxide; and Y—Mn—O ratio is a mass ratio of the Y—Mn—O to the sum of the Y—Mn—O and $Al_2O_3$ in the composition for exhaust gas purification, being represented by Y—Mn—O/(Y—Mn—O+$Al_2O_3$).

2. The composition according to claim 1, wherein the Y—Mn—O ratio is in the range of from 0.1 to 0.9.

3. The composition according to claim 1, wherein the Y—Mn—O has a particle diameter D50 of 6 μm or smaller, the D50 being a particle diameter at 50% of a cumulative particle size distribution on a volume basis as measured by laser diffraction particle size analysis.

4. The composition according to claim 1, wherein the $Al_2O_3$ is θ-alumina.

5. A catalyst for exhaust gas purification comprising the composition according to claim 1 and a catalyst active component, the catalyst active component comprising at least one element selected from Ag, Mn, Ni, Pt, Pd, Rh, Au, Cu, Fe, and Co.

* * * * *